US010442416B2

(12) United States Patent
Jung

(10) Patent No.: US 10,442,416 B2
(45) Date of Patent: Oct. 15, 2019

(54) ELECTRIC BRAKE SYSTEM AND METHOD THEREOF

(71) Applicant: MANDO CORPORATION, Pyeongtaek-si, Gyeonggi-do (KR)

(72) Inventor: Sam-Hyun Jung, Seongnam-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 15/729,311

(22) Filed: Oct. 10, 2017

(65) Prior Publication Data

US 2018/0099652 A1 Apr. 12, 2018

(30) Foreign Application Priority Data

Oct. 10, 2016 (KR) .................. 10-2016-0130560

(51) Int. Cl.
*B60T 8/88* (2006.01)
*B60T 7/04* (2006.01)
*B60T 8/32* (2006.01)
*B60T 8/58* (2006.01)
*B60T 13/66* (2006.01)
*B60T 8/00* (2006.01)
*B60T 13/68* (2006.01)
(Continued)

(52) U.S. Cl.
CPC .............. *B60T 8/885* (2013.01); *B60T 7/042* (2013.01); *B60T 8/00* (2013.01); *B60T 8/3205* (2013.01); *B60T 8/4081* (2013.01); *B60T 8/58* (2013.01); *B60T 13/662* (2013.01); *B60T 13/686* (2013.01); *B60T 13/745* (2013.01); *B60T 2220/04* (2013.01); *B60T 2270/413* (2013.01); *B60T 2270/416* (2013.01)

(58) Field of Classification Search
CPC .......... B60T 8/885; B60T 8/00; B60T 8/3205; B60T 8/4081; B60T 8/58; B60T 7/042
USPC ........................................................... 701/70
See application file for complete search history.

(56) References Cited

U.S. PATENT DOCUMENTS

2010/0268419 A1* 10/2010 Yasui .................... B60T 8/1755
701/41
2013/0205881 A1* 8/2013 Naether .................. B60T 7/042
73/121
(Continued)

FOREIGN PATENT DOCUMENTS

EP 2 520 473 A1 11/2012
KR 0120932 B1 8/1997
KR 10-1999-0086835 A 12/1999

*Primary Examiner* — Krishnan Ramesh
(74) *Attorney, Agent, or Firm* — Hauptman Ham, LLP

(57) ABSTRACT

Disclosed are an electric brake system and a control method thereof. The electric brake system includes a sensor part including at least three sensors among a motor position sensor MPS configured to measure a position of a motor, an acceleration sensor configured to measure a longitudinal acceleration of a vehicle, a wheel speed sensor configured to measure a wheel speed of the vehicle, and a pressure sensor configured to measure a brake hydraulic pressure of a wheel; and a controller configured to receive measured results from the at least three sensors among the motor position sensor MPS, the acceleration sensor, the wheel speed sensor, and the pressure sensor and determine that a sensor fails, which outputs a brake hydraulic pressure having a largest deviation among three or more brake hydraulic pressures that are estimated or measured from the at least three sensors.

8 Claims, 11 Drawing Sheets

(51) Int. Cl.
*B60T 13/74* (2006.01)
*B60T 8/40* (2006.01)

(56) References Cited

U.S. PATENT DOCUMENTS

2013/0218434 A1\* 8/2013 Inage .................... B60T 8/1755
                                                    701/70
2014/0379236 A1\* 12/2014 Kato ..................... B60T 8/1763
                                                    701/74

\* cited by examiner

ELECTRIC BRAKE SYSTEM AND METHOD THEREOF

CROSS REFERENCE TO RELATED APPLICATION

This application claims the benefit of Korean Patent Application No. 10-2016-0130560, filed on Oct. 10, 2016 in the Korean Intellectual Property Office, the disclosure of which is incorporated herein by reference.

BACKGROUND

1. Field

Embodiments of the present disclosure relate to an electric brake system, and more particularly, to an electric brake system configured to generate a braking force using an electrical signal corresponding to displacement of a brake pedal.

2. Description of the Related Art

A brake system for braking is necessarily equipped in a vehicle, and a variety of systems for providing stronger and more stable braking have been proposed recently.

For example, there are brake systems including an anti-lock brake system (ABS) for preventing a wheel from sliding while braking, a brake traction control system (BTCS) for preventing a drive wheel from slipping when a vehicle is suddenly unintentionally accelerated or intentionally accelerated, an electronic stability control (ESC) system for stably maintaining a driving state of a vehicle by combining an ABS with traction control to control a hydraulic pressure of a brake, and the like.

Generally, an electric brake system includes a hydraulic pressure supply device which receives a braking intent from a driver in a form of an electrical signal from a pedal displacement sensor which senses a displacement of a brake pedal when the driver steps on the brake pedal and then supplies a hydraulic pressure to a wheel cylinder.

An electric brake system provided with such a hydraulic pressure supply device is disclosed in European Registered Patent No. EP 2 520 473. According to the disclosure in that document, the hydraulic pressure supply device is configured such that a motor operates according to a pedal effort of a brake pedal to generate a braking pressure. At this point, the braking pressure is generated by converting a rotational force of the motor into a rectilinear movement to pressurize a piston.

However, in the conventional electric hydraulic pressure brake device, a hydraulic pressure pumped from an electric hydraulic pressure pump is sensed by a brake hydraulic pressure sensor, and the hydraulic pressure is controlled on the basis of a value sensed by the brake hydraulic pressure sensor.

Since the conventional electric hydraulic brake device controls the hydraulic pressure on the basis of the value sensed by the brake hydraulic pressure sensor, a validity effectiveness determination of the brake hydraulic pressure sensor is important.

Therefore, in recent years, research has been continuously carried out for an improved validity determination device for a brake hydraulic pressure sensor and a method having an improved validity determination method therefor, which are capable of improving reliability with respect to a validity determination of the brake hydraulic pressure sensor by estimating a brake hydraulic pressure value using other parameters and comparing the estimated brake hydraulic pressure value with a value of the brake hydraulic pressure sensor to determine validity of the brake hydraulic pressure sensor.

In addition, in recent years, research has been continuously carried out for a method having an improved validity determination method for a brake hydraulic pressure sensor, which is capable of causing a driver to drive more carefully and reducing driver's anxiety by informing the driver of the current state of the brake hydraulic pressure sensor and a current state of estimating a brake hydraulic pressure value.

PRIOR ART DOCUMENT

Patent Document

European Registered Patent No. EP 2 520 473 A1 (Honda Motor Co., Ltd.), Nov. 7, 2012.

SUMMARY

Therefore, it is an aspect of the present disclosure to improve reliability of a validity determination for a brake hydraulic pressure sensor.

Also, another aspect of the present disclosure is a validity determination method for a brake hydraulic pressure sensor capable of reducing driver's anxiety about a sensor failure by continuously sensing failures and current states of the brake hydraulic pressure sensor, a longitudinal acceleration sensor, and a motor position sensor.

Additional aspects of the disclosure will be set forth in part in the description which follows and, in part, will be obvious from the description, or may be learned by practice of the disclosure.

According to one aspect of the present disclosure, there may be provided an electric brake system of a vehicle, which includes a sensor part including at least three sensors among a motor position sensor MPS configured to measure a position of a motor, an acceleration sensor configured to measure a longitudinal acceleration of a vehicle, a wheel speed sensor configured to measure a wheel speed of the vehicle, and a pressure sensor configured to measure a brake hydraulic pressure of a wheel; and a controller configured to receive measured results from the at least three sensors among the motor position sensor MPS, the acceleration sensor, the wheel speed sensor, and the pressure sensor and determine that a sensor fails, which outputs a brake hydraulic pressure having a largest deviation among three or more brake hydraulic pressures that are estimated or measured from the at least three sensors.

Also, according to another one aspect of the present disclosure, there may be provided an electric brake system of a vehicle, which includes a sensor part including at least three sensors among a pedal position sensor configured to measure a position of a pedal, an acceleration sensor configured to measure a longitudinal acceleration of a vehicle, a wheel speed sensor configured to measure a wheel speed of the vehicle, and a pressure sensor configured to measure a brake hydraulic pressure of a wheel; and a controller configured to receive measured results from the at least three sensors among the pedal position sensor, the acceleration sensor, the wheel speed sensor, and the pressure sensor, and determine that a sensor fails, which outputs a brake hydraulic pressure having a largest deviation among three or more brake hydraulic pressures that are estimated or measured from the at least three sensors.

Also, the three or more brake hydraulic pressures may be configured with three pressures among a first brake hydraulic pressure estimated on the basis of the position of the motor, a second brake hydraulic pressure estimated on the basis of the longitudinal acceleration, a third brake hydraulic pressure estimated on the basis of the wheel speed, and a fourth brake hydraulic pressure measured by the pressure sensor.

Also, the controller may further determine that a sensor fails, which outputs a brake hydraulic pressure having a largest deviation in variation among the three or more brake hydraulic pressures.

Also, the controller may warn of a failure of the sensor that is determined to fail.

According to still another one aspect of the present disclosure, there may be provided a control method of an electric brake system of a vehicle, which includes receiving at least three sensor information among position information of a motor measured by a motor position sensor MPS, longitudinal acceleration information of a vehicle measured by an acceleration sensor, wheel speed information measured by a wheel speed sensor, and brake hydraulic pressure information measured by a pressure sensor; estimating independently a brake hydraulic pressure on the basis of the at least three received sensor information or receiving the measured brake hydraulic pressure information; and determining that a sensor fails, which outputs a brake hydraulic pressure having a largest deviation among three or more brake hydraulic pressures that are estimated or measured.

Also, according to yet another one aspect of the present disclosure, there may be provided a control method of electric brake system of a vehicle, which includes receiving at least three sensor information among position information of a motor measured by a motor position sensor MPS, longitudinal acceleration information of a vehicle measured by an acceleration sensor, wheel speed information measured by a wheel speed sensor, and brake hydraulic pressure information measured by a pressure sensor; estimating independently a brake hydraulic pressure on the basis of the at least three received sensor information or receiving the measured brake hydraulic pressure information; and determining that a sensor fails, which outputs a brake hydraulic pressure having a largest deviation among three or more brake hydraulic pressures that are estimated or measured.

Also, according to still yet another one aspect of the present disclosure, there may be provided a control method of an electric brake system of a vehicle, which includes receiving at least three sensor information among pedal position information measured by a brake pedal position sensor, longitudinal acceleration information of a vehicle measured by an acceleration sensor, wheel speed information measured by a wheel speed sensor, and brake hydraulic pressure information measured by a pressure sensor; estimating independently a brake hydraulic pressure on the basis of the at least three received sensor information or receiving the measured brake hydraulic pressure information; and determining that a sensor fails, which outputs a brake hydraulic pressure having a largest deviation among three or more brake hydraulic pressures that are estimated or measured.

Also, the three or more brake hydraulic pressures may be configured with three among a first brake hydraulic pressure estimated on the basis of the position of the motor, a second brake hydraulic pressure estimated on the basis of the longitudinal acceleration, a third brake hydraulic pressure estimated on the basis of the wheel speed, and a fourth brake hydraulic pressure measured by the pressure sensor.

Also, the method may further include determining that a sensor fails, which outputs a brake hydraulic pressure having a largest deviation among the three or more brake hydraulic pressures.

Also, the method may further include warning of a failure of the sensor that is determined to fail.

DETAILED DESCRIPTION

Figure 1:
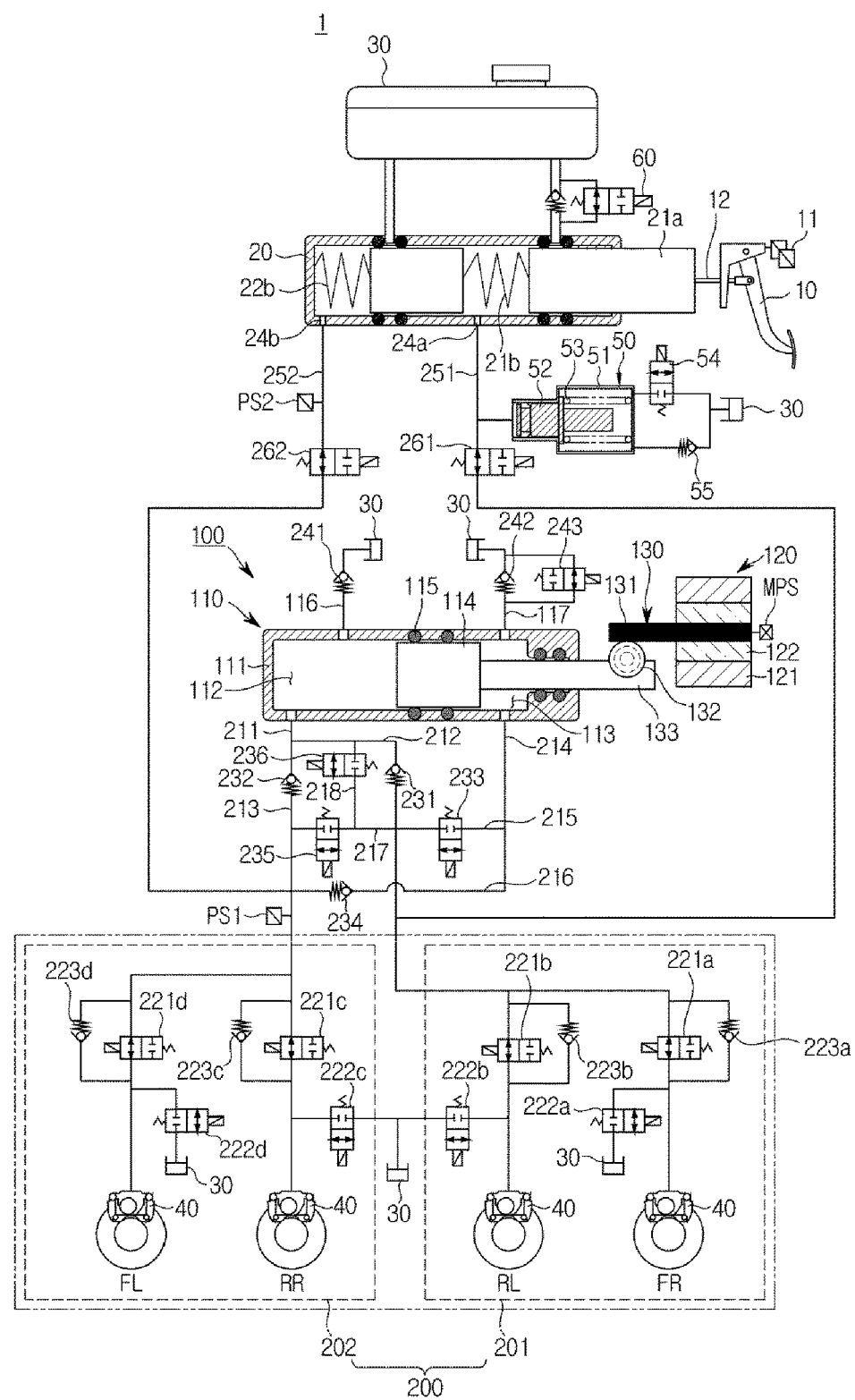
FIG. 1 is a hydraulic pressure circuit diagram illustrating a non-braking state of an electric brake system according to an embodiment of the present disclosure.

Hereinafter, embodiments of the present disclosure will be described in detail with reference to the accompanying drawings. The embodiments to be described below are provided to fully convey the spirit of the present disclosure to those skilled in the art. The present disclosure is not limited to the embodiments disclosed herein and may be implemented in other forms. In the drawings, some portions not related to the description will be omitted and will not be shown in order to clearly describe the present disclosure, and also a size of a component may be somewhat exaggerated to help understanding.

FIG. 1 is a hydraulic pressure circuit diagram illustrating a non-braking state of an electric brake system 1 according to an embodiment of the present disclosure.

Referring to FIG. 1, the electric brake system 1 is generally configured with a master cylinder 20 configured to generate a hydraulic pressure, a reservoir 30 coupled to an upper part of the master cylinder 20 to store oil, an input rod 12 configured to pressurize the master cylinder 20 according to a pedal effort of a brake pedal 10, a wheel cylinder 40 configured to receive the hydraulic pressure and perform braking of each of wheels RR, RL, FR, and FL, a pedal displacement sensor 11 configured to sense a displacement of the brake pedal 10, and a simulation device 50 configured to provide a reaction force according to the pedal effort of the brake pedal 10.

In addition, although not shown in FIG. 1, a wheel speed sensor may be provided at each of the wheel cylinders 40 to measure a speed of each of the wheels FL, RR, RL, and FR.

The master cylinder 20 may be configured to include at least one chamber to generate a hydraulic pressure. As one example, the master cylinder 20 may be configured to include two chambers, a first piston 21a and a second piston 22a may be provided at the two chambers, and the first piston 21a may be connected to the input rod 12. Further, the master cylinder 20 may include first and second hydraulic ports 24a and 24b which are formed thereon and through which a hydraulic pressure is delivered from each of the two chambers.

The master cylinder 20 may include the two chambers to secure safety when one chamber fails. For example, one of the two chambers may be connected to a front right wheel FR and a rear left wheel RL of a vehicle, and the remaining chamber may be connected to a front left wheel FL and a rear right wheel RR thereof. As described above, the two chambers may be independently configured such that braking of the vehicle may be possible even when one of the two chambers fails.

Also, a first spring 21b may be provided between the first piston 21a and the second piston 22a of the master cylinder 20, and a second spring 22b may be provided between the second piston 22a and a distal end of the master cylinder 20.

The first spring 21b and the second spring 22b are provided in the two chambers, and as a displacement of the brake pedal 10 is varied, the first piston 21a and the second piston 22a are compressed and thus an elastic force is stored in the first spring 21b and the second spring 22b. Further, when a force pushing the first piston 21a is less than the elastic force, the first spring 21b and the second spring 22b may use the stored elastic force to push the first and second pistons 21a and 22a, respectively and return the first and second pistons 21a and 22a to their original positions.

The input rod 12 configured to pressurize the first piston 21a of the master cylinder 20 may be in close contact with the first piston 21a. That is, there may be no gap between the master cylinder 20 and the input rod 12. Consequently, when the brake pedal 10 is stepped on, the master cylinder 20 may be directly pressurized without a pedal dead stroke section.

The simulation device 50 may be connected to a first backup flow path 251, which will be described below, to provide a reaction force according to a pedal effort of the brake pedal 10. A reaction force may be provided to compensate for a pedal effort provided from a driver such that a braking force may be finely controlled as intended by the driver.

Referring to FIG. 1, the simulation device 50 includes a simulation chamber 51 provided to store oil flowing out from the first hydraulic pressure port 24a of the master cylinder 20, a reaction force piston 52 provided inside the simulation chamber 51, a pedal simulator provided with a reaction force spring 53 that is configured to elastically support the reaction force piston 52, and a simulator valve 54 connected to a rear end part of the simulation chamber 51.

The reaction force piston 52 and the reaction force spring 53 are installed to have a predetermined range of a displacement within the simulation chamber 51 by oil flowing therein.

The simulation valve 54 may be provided at a flow path connecting the rear end of the simulation chamber 51 to a reservoir 30. A front end of the simulation chamber 51 may be connected to the master cylinder 20, and the rear end of the simulation chamber 51 may be connected to the reservoir 30 through the simulator valve 54. Therefore, even when the reaction force piston 52 returns, oil in the reservoir 30 may flow in the simulation chamber 51 through the simulator valve 54 so that an inside of the simulation chamber 51 is entirely filled with the oil.

A plurality of reservoirs 30 are shown in the drawing, and the same reference number is assigned to each of the plurality of reservoirs 30. Here, these reservoirs 30 may be configured with the same components, and may alternatively be configured with different components. As one example, the reservoir 30 connected to the simulation device 50 may be the same as the reservoir 30 connected to the master cylinder 20, or may be a storage part capable of storing oil separately from the reservoir 30 that is connected to the master cylinder 20.

The simulator valve 54 may be configured with a normally closed type solenoid valve that is usually kept in a closed state. When the driver applies a pedal effort to the brake pedal 10, the simulator valve 54 may be opened to deliver oil in the simulation chamber 51 to the reservoir 30.

Also, a simulator check valve 55 may be installed to be connected in parallel with the simulator valve 54 between the pedal simulator and the reservoir 30. The simulator check valve 55 may allow the oil in the reservoir 30 to flow toward the simulation chamber 51 and may block the oil in the simulation chamber 51 from flowing toward the reservoir 30 through a flow path at which the simulator check valve 55 is installed. When the pedal effort of the brake pedal 10 is released, the oil may be provided inside the simulation chamber 51 through the simulator check valve 55 to ensure a rapid return of a pressure in the pedal simulator.

The hydraulic pressure supply device 100 may include a hydraulic pressure supply unit 110 configured to provide an oil pressure delivered to the wheel cylinders 40, a motor 120 configured to generate a rotational force in response to an electrical signal from the pedal displacement sensor 11, and a power converter 130 configured to convert a rotational movement of the motor 120 into a rectilinear movement and transmit the rectilinear movement to the hydraulic pressure supply unit 110. Alternatively, the hydraulic pressure supply unit 110 may operates by a pressure provided from a high-pressure accumulator instead of a driving force supplied from the motor 120.

The electric brake system 1 according to the embodiment of the present disclosure may include the hydraulic pressure supply device 100 configured to operate mechanically and to receive a braking intent from a driver in a form of an electrical signal from the pedal displacement sensor 11 sensing a displacement of the brake pedal 10; a hydraulic pressure control unit 200 configured with first and second hydraulic pressure circuits 201 and 202, which are each provided with two wheels among the wheels RR, RL, FR, and FL and configured to control a flow of a hydraulic pressure delivered to the wheel cylinders 40 provided at the wheels RR, RL, FR, and FL; a first cut valve 261 provided at the first backup flow path 251 connecting the first hydraulic pressure port 24a to the first hydraulic pressure circuit 201 and configured to control the flow of the hydraulic pressure; a second cut valve 262 provided at a second backup flow path 252 connecting the second hydraulic pressure port 24b to the second hydraulic pressure circuit 202 and configured to control the flow of the hydraulic pressure; and an electronic control unit 2000 configured to control the hydraulic pressure supply device 100 and valves 54, 60, 221a, 221b, 221c, 221d, 222a, 222b, 222c, 222d, 233, 235, 236, and 243 on the basis of hydraulic pressure information and pedal displacement information.

The electronic control unit 2000 may collectively perform control of the electric brake system 1.

As shown in FIG. 1, the hydraulic pressure supply unit 110 includes a cylinder block 111 in which a pressure chamber configured to receive and store oil is formed, a hydraulic piston 114 accommodated inside the cylinder block 111, sealing members 115 (that is, 115a and 115b) provided between the hydraulic piston 114 and the cylinder block 111 and configured to seal the pressure chamber, and a drive shaft 133 connected to a rear end of the hydraulic piston 114 and configured to transmit power which is output from the power converter 130 to the hydraulic piston 114.

The pressure chamber may include a first pressure chamber 112 located at a front side (in a forward direction, that is, toward the left in the drawing) of the hydraulic piston 114, and a second pressure chamber 113 located at a rear side (in a backward direction, that is, toward the right in the drawing) of the hydraulic piston 114. That is, the first pressure chamber 112 is comparted by the cylinder block 111 and a front end of the hydraulic piston 114 and is configured to have a volume that varies according to a movement of the hydraulic piston 114, and the second pressure chamber 113 is comparted by the cylinder block 111 and a rear end of the hydraulic piston 114 and is configured to have a volume that varies according to the movement of the hydraulic piston 114.

The first and second pressure chambers 112 and 113 may be connected to the reservoir 30 by dump flow paths 116 and 117, respectively, and may receive and store oil supplied from the reservoir 30 or deliver oil in the first or second pressure chamber 112 or 113 to the reservoir 30.

Next, flow paths 211, 212, 213, 214, 215, 216, and 217 and valves 231, 232, 233, 234, 235, 236, 241, 242, and 243, which are connected to the first pressure chamber 112 and the second pressure chamber 113, respectively, will be described.

A second hydraulic flow path 212 may communicate with the first hydraulic pressure circuit 201, and a third hydraulic flow path 213 may communicate with the second hydraulic pressure circuit 202. Therefore, a hydraulic pressure may be delivered to both the first hydraulic pressure circuit 201 and the second hydraulic pressure circuit 202 while the hydraulic piston 114 is moved forward.

Also, the electric brake system 1 according to the embodiment of the present disclosure may include a first control valve 231 and a second control valve 232 which are provided at the second and third hydraulic flow paths 212 and 213, respectively, and are configured to control an oil flow.

Further, the first and second control valves 231 and 232 may be configured with check valves which allow oil to flow only in a direction toward the first or second hydraulic pressure circuit 201 or 202, respectively, from the first pressure chamber 112, and block the oil from flowing in a reverse direction. That is, the first or second control valve 231 or 232 may allow the hydraulic pressure of the first pressure chamber 112 to be delivered to the first or second hydraulic pressure circuit 201 or 202, and prevent a hydraulic pressure of the first or second hydraulic pressure circuit 201 and 202 from leaking into the first pressure chamber 112 through the second or third hydraulic flow path 212 or 213.

A fourth hydraulic flow path 214 may branch into a fifth hydraulic flow path 215 and a sixth hydraulic flow path 216 at the middle of the fourth hydraulic flow path 214, thereby communicating with both the first hydraulic pressure circuit 201 and the second hydraulic pressure circuit 202. As one example, the fifth hydraulic flow path 215 branching from the fourth hydraulic flow path 214 may communicate with the first hydraulic pressure circuit 201, and the sixth hydraulic flow path 216 branching from the fourth hydraulic flow path 214 may communicate with the second hydraulic pressure circuit 202. Accordingly, a hydraulic pressure may be delivered to both the first hydraulic pressure circuit 201 and the second hydraulic pressure circuit 202 while the hydraulic piston 114 is moved backward.

Also, the electric brake system 1 according to the embodiment of the present disclosure may include a third control valve 233 provided at the fifth hydraulic flow path 215 and configured to control an oil flow, and a fourth control valve 234 provided at the sixth hydraulic flow path 216 and configured to control an oil flow.

The third control valve 233 may be configured with a bidirectional control valve which controls an oil flow between the second pressure chamber 113 and the first hydraulic pressure circuit 201. Further, the third control valve 233 may be configured with a normally closed type solenoid valve that is opened when an opening signal is received from the electronic control unit 2000.

Also, the fourth control valve 234 may be configured with a check valve which allows oil to flow only in a direction from the second pressure chamber 113 toward the second hydraulic pressure circuit 202 and blocks oil from flowing in a reverse direction. That is, the fourth control valve 234 may prevent the hydraulic pressure of the second hydraulic pressure circuit 202 from leaking into the second pressure chamber 113 through the sixth hydraulic flow path 216 and the fourth hydraulic flow path 214.

Also, the electric brake system 1 according to the embodiment of the present disclosure may include a fifth control valve 235 configured to control an oil flow and provided at a seventh hydraulic flow path 217 connecting the second hydraulic flow path 212 to the third hydraulic flow path 213, and a sixth control valve 236 configured to control an oil flow and provided at an eighth hydraulic flow path 218 connecting the second hydraulic flow path 212 to the seventh hydraulic flow path 217. Further, the fifth control valve 235 and the sixth control valve 236 may be configured with normally closed type solenoid valves that are opened when an opening signal is received from the electronic control unit 2000.

The fifth control valve 235 and the sixth control valve 236 may be opened when the first control valve 231 or the second control valve 232, respectively, is operated abnormally, thereby allowing the hydraulic pressure of the first pressure chamber 112 to be delivered to both the first hydraulic pressure circuit 201 and the second hydraulic pressure circuit 202.

Further, the fifth control valve 235 and the sixth control valve 236 may be operated to be open when a hydraulic pressure of each of the wheel cylinders 40 is discharged and then delivered to the first pressure chamber 112. This is because the first control valve 231 and the second control valve 232 provided at the second hydraulic flow path 212 and the third hydraulic flow path 213, respectively, are configured with check valves allowing oil to flow in one direction.

Also, the electric brake system 1 according to the embodiment of the present disclosure may further include a first dump valve 241 and a second dump valve 242 provided at the first and second dump flow paths 116 and 117, respectively, and configured to control an oil flow. The dump valves 241 and 242 may be check valves that open in a direction from the reservoir 30 to the first and second pressure chambers 112 and 113, and block in a reverse direction. That is, the first dump valve 241 may be a check valve that allows oil to flow from the reservoir 30 to the first pressure chamber 112 and blocks the oil from flowing from the first pressure chamber 112 to the reservoir 30, and the second dump valve 242 may be a check valve that allows oil to flow from the reservoir 30 to the second pressure chamber 113 and blocks the oil from flowing from the second pressure chamber 113 to the reservoir 30.

Also, the second dump flow path 117 may include a bypass flow path, and a third dump valve 243 may be installed at the bypass flow path to control an oil flow between the second pressure chamber 113 and the reservoir 30.

The third dump valve 243 may be configured with a solenoid valve capable of bidirectionally controlling an oil flow, and with a normally open type solenoid valve that is closed when a closing signal is received from the electronic control unit 2000.

The hydraulic pressure supply unit 110 of the electric brake system 1 according to the embodiment of the present disclosure may operate with double action. That is, a hydraulic pressure, which is generated in the first pressure chamber 112 while the hydraulic piston 114 is moved forward, may be delivered to the first hydraulic pressure circuit 201 through the first hydraulic flow path 211 and the second hydraulic flow path 212 to operate the wheel cylinders 40 installed at the front right wheel FR and the rear left wheel RL, and may be delivered to the second hydraulic pressure circuit 202 through the first hydraulic flow path 211 and the third hydraulic flow path 213 to operate the wheel cylinders 40 installed at the rear right wheel RR and the front left wheel FL.

Similarly, a hydraulic pressure, which is generated in the second pressure chamber 113 while the hydraulic piston 114 is moved backward, may be delivered to the first hydraulic pressure circuit 201 through the fourth hydraulic flow path 214 and the fifth hydraulic flow path 215 to operate the wheel cylinders 40 installed at the front right wheel FR and the rear left wheel RL, and may be delivered to the second hydraulic pressure circuit 202 through the fourth hydraulic flow path 214 and the sixth hydraulic flow path 216 to operate the wheel cylinders 40 installed at the rear right wheel RR and the front left wheel FL.

Also, a negative pressure, which is generated in the first pressure chamber 112 while the hydraulic piston 114 is moved backward, may cause oil in the wheel cylinders 40 installed at the front right wheel FR and the rear left wheel RL to be suctioned and delivered to the first pressure chamber 112 through the first hydraulic pressure circuit 201, the second hydraulic flow path 212, and the first hydraulic flow path 211, and may cause oil in the wheel cylinders 40 installed at the rear right wheel RR and the front left wheel FL to be suctioned and delivered to the first pressure chamber 112 through the second hydraulic pressure circuit 202, the third hydraulic flow path 213, and the first hydraulic flow path 211.

Next, the motor 120 and the power converter 130 of the hydraulic pressure supply device 100 will be described.

The motor 120 is a device configured to generate a rotational force according to a signal output from the electronic control unit 2000 and may generate the rotational force in a forward or backward direction. An angular velocity and a rotational angle of the motor 120 may be precisely controlled.

Further, a motor position sensor MPS is a motor control sensor configured to control a rotational angle or a current of the motor 120.

That is, the motor position sensor MPS configured to measure a rotational angle or a current of the motor 120 is further included such that position information such as a rotational angle of the motor 120 and the like, may be transmitted to the electronic control unit 2000.

The electronic control unit 2000 controls the motor 120 as well as valves 54, 60, 221a, 221b, 221c, 221d, 222a, 222b, 222c, 222d, 233, 235, 236, and 243 which configures a plurality of valves 800 provided at the electric brake system 1 of the present disclosure, which will be described below.

In addition, an operation of the electronic control unit 2000, which controls the plurality of valves 800 according to a displacement of the brake pedal 10, will be described below.

A driving force of the motor 120 generates a displacement of the hydraulic piston 114 through the power converter 130, and a hydraulic pressure, which is generated while the hydraulic piston 114 slides inside the pressure chamber, is delivered to the wheel cylinder 40 installed at each of the wheels RR, RL, FR, and FL through the first and second hydraulic flow paths 211 and 212.

The power converter 130 is a device configured to convert a rotational force into a rectilinear movement, and as one example, may be configured with a worm shaft 131, a worm wheel 132, and the drive shaft 133.

That is, a signal, which is sensed by the pedal displacement sensor 11 when a displacement occurs at the brake pedal 10, is transmitted to the electronic control unit 2000 and then the electronic control unit 2000 drives the motor 120 in one direction to rotate the worm shaft 131 in that direction. A rotational force of the worm shaft 131 is transmitted to the drive shaft 133 via the worm wheel 132, and then the hydraulic piston 114 connected to the drive shaft 133 is moved forward to generate a hydraulic pressure in the first pressure chamber 112.

On the other hand, when the pedal effort is released from the brake pedal 10, the electronic control unit 2000 drives the motor 120 in a reverse direction, and thus the worm shaft 131 is reversely rotated. Consequently, the worm wheel 132 is also reversely rotated, and thus a negative pressure is generated in the first pressure chamber 112 while the hydraulic piston 114 connected to the drive shaft 133 is returned to its original position, that is, moved backward.

It is possible for generation of the hydraulic pressure and the negative pressure to be opposite to that which is described above. That is, a signal, which is sensed by the pedal displacement sensor 11 when a displacement occurs at the brake pedal 10, is transmitted to the electronic control unit 2000 and then the electronic control unit 2000 drives the motor 120 in a reverse direction to rotate the worm shaft 131 in the reverse direction. A rotational force of the worm shaft 131 is transmitted to the drive shaft 133 via the worm wheel 132, and then the hydraulic piston 114 connected to the drive shaft 133 is moved backward to generate a hydraulic pressure in the second pressure chamber 113.

On the other hand, when the pedal effort is released from the brake pedal 10, the electronic control unit 2000 drives the motor 120 in one direction, and thus the worm shaft 131 is rotated in that direction. Consequently, the worm wheel 132 is also reversely rotated, and thus a negative pressure is generated in the second pressure chamber 113 while the hydraulic piston 114 connected to the driving shaft 133 is returned to its original position, that is, moved forward.

As described above, the hydraulic pressure supply device 100 serves to deliver the hydraulic pressure to the wheel cylinders 40 or to suction and deliver the hydraulic pressure to the reservoir 30 according to a rotational direction of the rotational force generated from the motor 120.

When the motor 120 is rotated in one direction, the hydraulic pressure may be generated in the first pressure chamber 112 or the negative pressure may be generated in the second pressure chamber 113, and whether the hydraulic pressure is used for braking or the negative pressure is used for releasing braking may be determined through the control of the valves 54, 60, 221a, 221b, 221c, 221d, 222a, 222b, 222c, 222d, 233, 235, 236, and 243 which configure the plurality of valves 800.

Further, it should be understood that the power converter 130 according to the embodiment of the present disclosure may employ any structure capable of converting a rotational movement into a rectilinear movement, in addition to the structure of a ball screw nut assembly.

The first cut valve 261 configured to control an oil flow may be provided at the first backup flow path 251, and the second cut valve 262 configured to control an oil flow may be provided at the second backup flow path 252. Also, the first backup flow path 251 may connect the first hydraulic pressure port 24a to the first hydraulic pressure circuit 201, and the second backup flow path 252 may connect the second hydraulic pressure port 24b to the second hydraulic pressure circuit 202.

Further, the first and second cut valves 261 and 262 may be configured with normally open type solenoid valves that are closed when a closing signal is received from the electronic control unit 2000.

Next, the hydraulic pressure control unit 200 according to the embodiment of the present disclosure will be described with reference to FIG. 1.

The hydraulic pressure control unit 200 may be configured with the first hydraulic pressure circuit 201 and the second hydraulic pressure circuit 202 which each receives a hydraulic pressure and controls two wheels. As one example, the first hydraulic pressure circuit 201 may control the front right wheel FR and the rear left wheel RL, and the second hydraulic pressure circuit 202 may control the front left wheel FL and the rear right wheel RR. Further, the wheel cylinder 40 is installed at each of the wheels FR, FL, RR, and RL to perform braking by receiving the hydraulic pressure.

The first hydraulic pressure circuit 201 is connected to the first hydraulic flow path 211 and the second hydraulic flow path 212 to receive a hydraulic pressure supplied from the hydraulic pressure supply device 100, and the second hydraulic flow path 212 branches into two flow paths which are respectively connected to the front right wheel FR and the rear left wheel RL. Similarly, the second hydraulic pressure circuit 202 is connected to the first hydraulic flow path 211 and the third hydraulic flow path 213 to receive the hydraulic pressure supplied from the hydraulic pressure supply device 100, and the third hydraulic flow path 213 branches into two flow paths which are connected to the front left wheel FL and the rear right wheel RR, respectively.

The hydraulic pressure circuits 201 and 202 may be provided with a plurality of inlet valves 221 (that is, 221a, 221b, 221c, and 221d) to control a flow of the hydraulic pressure. As one example, two inlet valves 221a and 221b may be provided at the first hydraulic pressure circuit 201 and connected to the first hydraulic flow path 211 to control the hydraulic pressure delivered to two of the wheel cylinders 40. Also, two inlet valves 221c and 221d may be provided at the second hydraulic pressure circuit 202 and connected to the second hydraulic flow path 212 to control the hydraulic pressure delivered to two of the wheel cylinders 40.

Further, the plurality of inlet valves 221 may be disposed at an upstream side of each of the wheel cylinders 40 and may be configured with normally open type solenoid valves that are closed when a closing signal is received from the electronic control unit 2000.

Also, the hydraulic pressure circuits 201 and 202 may include check valves 223a, 223b, 223c, and 223d which are provided at a bypass flow path connecting a front side to a rear side of each of the inlet valves 221a, 221b, 221c, and 221d, respectively. Each of the check valves 223a, 223b, 223c, and 223d may be provided to allow oil to flow only in a direction from the wheel cylinder 40 to the hydraulic pressure supply unit 110 and block oil from flowing in a direction from the hydraulic pressure supply unit 110 to the wheel cylinder 40. Each of the check valves 223a, 223b, 223c, and 223d may be operated to rapidly discharge a braking pressure from the wheel cylinder 40, and allow the hydraulic pressure of the wheel cylinder 40 to be delivered to the hydraulic pressure supply unit 110 when the inlet valves 221a, 221b, 221c, and 221d are operated abnormally.

Also, the hydraulic pressure circuits 201 and 202 may be further provided with a plurality of outlet valves 222 (that is, 222a, 222b, 222c, and 222d) connected to the reservoirs 30 to improve brake release performance when braking is released. Each of the outlet valves 222 is connected to the wheel cylinder 40 to control discharging of the hydraulic pressure from each of the wheels RR, RL, FR, and FL. That is, when a braking pressure of each of the wheels RR, RL, FR, and FL is sensed and a decompression of the braking is determined as being required, the outlet valves 222 may be selectively opened to control the braking pressure.

Further, the outlet valves 222 may be configured with normally closed type solenoid valves that are opened when an opening signal is received from the electronic control unit 2000.

In addition, the hydraulic pressure control unit 200 may be connected to the backup flow paths 251 and 252. As one example, the first hydraulic pressure circuit 201 may be connected to the first backup flow path 251 to receive the hydraulic pressure provided from the master cylinder 20, and the second hydraulic pressure circuit 202 may be connected to the second backup flow path 252 to receive the hydraulic pressure provided from the master cylinder 20.

At this point, the first backup flow path 251 may be connected to the first hydraulic pressure circuit 201 at an upstream side of each of the first and second inlet valves 221a and 221b. Similarly, the second backup flow path 252 may be connected to the second hydraulic pressure circuit 202 at an upstream side of each of the third and fourth inlet valves 221c and 221d. Consequently, when the first and second cut valves 261 and 262 are closed, the hydraulic pressure provided from the hydraulic pressure supply device 100 may be supplied to the wheel cylinders 40 through the first and second hydraulic pressure circuits 201 and 202, and, when the first and second cut valves 261 and 262 are open, the hydraulic pressure provided from the master cylinder 20 may be supplied to the wheel cylinders 40 through the first and second backup flow paths 251 and 252. At this point, since the plurality of inlet valves 221a, 221b, 221c, and 221d are each in an open state, there is no need to switch their operation states.

Hereinbefore, the circuit of the electronic brake system 1 has been described.

Next, a hydraulic pressure circuit of a vehicle according to another embodiment of the present disclosure will be described.

Figure 2:
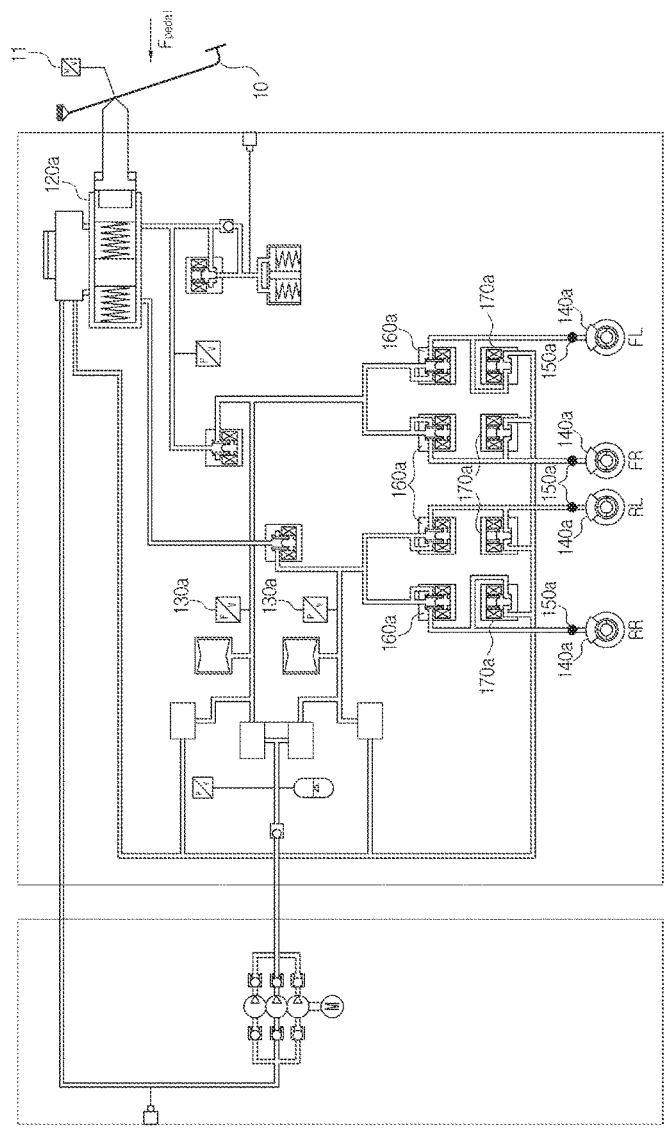
FIG. 2 is a hydraulic pressure circuit diagram illustrating a non-braking state of a hydraulic brake system according to another embodiment of the present disclosure.

Specifically, as shown in FIG. 2, like the hydraulic pressure circuit diagram shown in FIG. 1, a hydraulic pressure circuit of a vehicle according to one embodiment of the present disclosure includes a pedal position sensor 11 configured to sense a manipulation amount of the brake pedal 10, that is, a pedal effort of a driver Also, the hydraulic pressure circuit includes a master cylinder 120a configured to supply a brake hydraulic pressure according to a manipulation of the brake pedal 10 to cause a brake operation; a master pressure sensor 130a configured to sense a pressure of the master cylinder 120a, which is changed according to a braking intent from a driver; a wheel pressure sensor 150a provided at each of wheels FL, RR, RL, and FR and configured to sense an actual braking pressure applied to each of wheel cylinders 140a; a plurality of inlet valves 160a and a plurality of outlet valves 170a respectively installed at an inlet side and an outlet side of each of the wheel cylinders 140a, and configured to transmit a braking pressure; a hydraulic pressure braking control unit (not shown) configured to open and close the plurality of inlet valves 160a and the plurality of outlet valves 170a; and an electric hydraulic pressure booster (not shown) configured to generate a regenerative braking torque.

The hydraulic pressure braking control unit (not shown) senses a pedal effort of a driver through a pedal stroke sensed by the pedal position sensor 11 or a master pressure sensed by the master pressure sensor 130a.

Further, the hydraulic braking control unit (not shown) receives the regenerative braking torque generated by the electric hydraulic pressure booster (not shown) through a controller area network (CAN) communication or the like, and then generates a hydraulic pressure braking force obtained by subtracting a regenerative braking force corresponding to the regenerative braking torque of the front wheel or the rear wheel from the sensed pedal effort, thereby braking the rear wheel or the front wheel through the hydraulic pressure. Hereinafter, an operation of the electric brake system 1 according to the embodiment of the present disclosure will be described in detail below. First, FIG. 3 is a block diagram illustrating a configuration of the electronic brake system according to the present disclosure.

Figure 3:
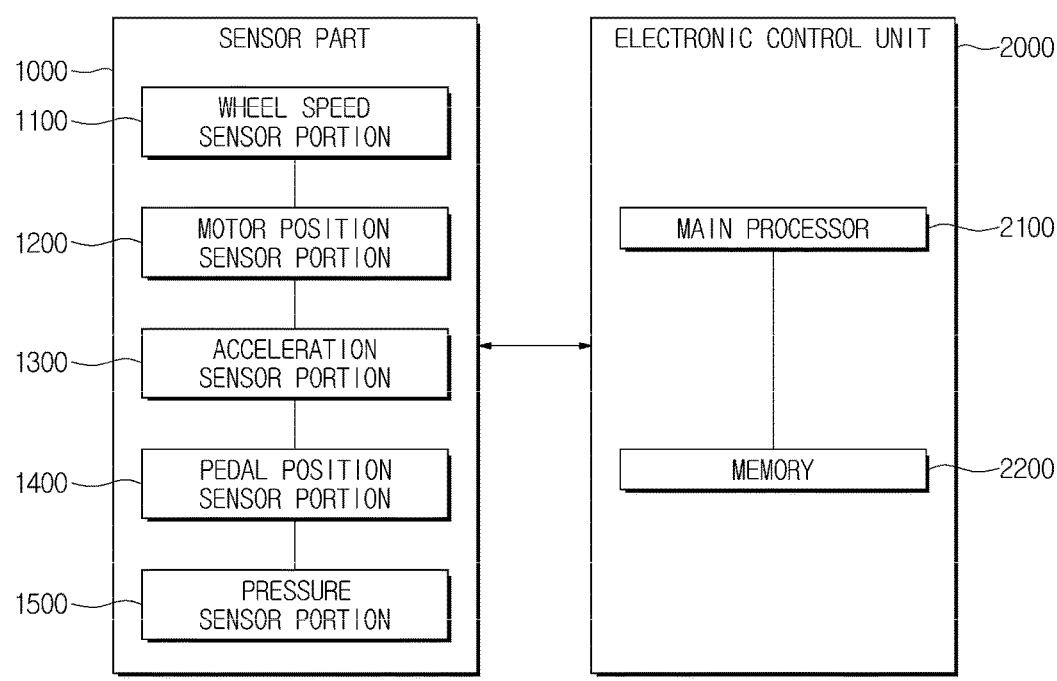
FIG. 3 is a schematic block diagram of an electric brake system according to one embodiment of the present disclosure.

As shown in FIG. 3, the electric brake system 1 according to the present disclosure may control the plurality of valves in the hydraulic pressure supply device 100 and the hydraulic pressure control unit 200 which are shown in FIG. 1, and may include a sensor part 1000 including the motor position sensor MPS, a wheel speed sensor (not shown), and the like, and the electronic control unit 2000 configured to determine whether the electric brake system 1 operates normally on the basis of sensed signals obtained from the sensor part 1000.

In addition, as shown in FIG. 3, in the case of the hydraulic pressure circuit shown in FIG. 2, the sensor part 1000 including the pedal position sensor 11, a wheel speed sensor (not shown), and the like which are included in the circuit of FIG. 2, and the electronic control unit 2000 configured to determine whether the electric brake system 1 operates normally on the basis of sensing signals obtained from the electronic control unit 1000 is included.

Specifically, the sensor part 1000 includes a wheel speed sensor portion 1100, a motor position sensor portion 1200, an acceleration sensor portion 1300, a pedal position sensor portion 1400, and a pressure sensor portion 1500.

In the sensor part 1000 of FIG. 3, the pedal position sensor portion 1400 and the motor position sensor portion 1200 are shown in the same sensor part 1000, but, in the case of the hydraulic pressure circuit of FIG. 2, the motor position sensor portion 1200 may be omitted.

The wheel speed sensor portion 1100 includes a wheel speed sensor (not shown). The wheel speed sensor is located at each of the wheels FL, RR, RL, and FR of the vehicle and transmits a measured wheel speed to the electronic control unit 2000.

The motor position sensor portion 1200 includes the motor position sensor MPS, and includes a motor control sensor configured to control a rotational angle or a current of the motor 120.

That is, the motor position sensor MPS configured to measure an angular velocity and a rotational angle of the motor 120 may transmit a rotational angle of the motor 120 and other position information thereof to the electronic control unit 2000.

The acceleration sensor portion 1300 includes an acceleration sensor (not shown). That is, the acceleration sensor employed in a vehicle may include a lateral acceleration sensor and a longitudinal acceleration sensor, and, when a movement direction of the vehicle is referred to as an X-axis and a vertical axis (that is, a Y-axis) against the movement direction is referred as a lateral direction, the lateral acceleration sensor measures an acceleration in the lateral direction.

The longitudinal acceleration sensor may measure an acceleration in the X-axis direction against the movement direction of the vehicle.

The acceleration sensor (not shown) is an element configured to detect a change in speed per unit time, and may measure dynamic forces such as an acceleration, vibration, shock, and the like using an inertia force, electrical deformation, and the gyro principle.

The pedal position sensor portion 1400 includes the pedal position sensor 11. That is, the pedal position sensor 11 measures a pedal effort of a driver, which is applied to the brake pedal 10.

The pressure sensor portion 1500 measures a hydraulic pressure in the electric brake system 1, and may include a plurality of pressure sensors.

Specifically, a pressure of each of the wheels FR, FL, RR, and RL may be measured through a pressure sensor (not shown) included in each of the wheels FR, FL, RR, and RL, and the measured pressure may be transmitted to the electronic control unit 2000, a reference numeral PS1 shown in FIG. 1 is a hydraulic flow path pressure sensor that may sense a hydraulic pressure of each of the hydraulic pressure circuits 201 and 202, and a reference numeral PS2 is a backup flow path pressure sensor that may measure a hydraulic pressure in the master cylinder 20.

Next, the electronic control unit 2000 collectively controls the electric brake system 1 of the vehicle according to the present disclosure, and includes a main processor 2100 configured to estimate brake hydraulic pressures on the basis of various sensor values measured by the sensor part 1000 and determine whether the sensors included in the sensor part 1000 are abnormal on the basis of the estimated brake hydraulic pressures; and a memory 2200 configured to store various data required for operation of the main processor 2100.

Figure 4:
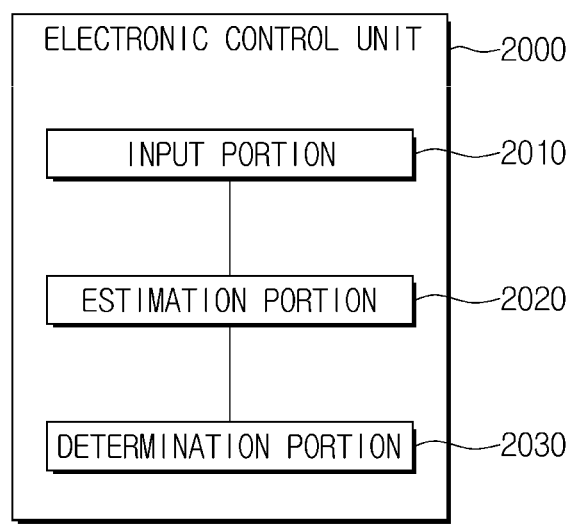
FIG. 4 is a block diagram of an electronic control unit in the electric brake system according to one embodiment of the present disclosure.

As shown in FIG. 4, the electronic control unit 2000 may include an input portion 2010, an estimation portion 2020, and a determination portion 2030 in a form of software.

First, the input portion 2010 receives the various sensor values acquired by the sensor part 1000.

That is, the input portion 2010 receives a speed of each wheel from the wheel speed sensor portion 1100 included in the sensor part 1000. Also, the input portion 2010 receives information on a motor position from the motor position sensor portion 1200. Further, the input portion 2010 obtains an acceleration value including lateral acceleration information and longitudinal acceleration information of the vehicle from the acceleration sensor portion 1300, receives pedal position information from the pedal position sensor portion 1400, and obtains pressure values measured by one or more pressure sensors (for example, PS1 and PS2 of FIG. 1) included in the electric brake system 1 from the pressure sensor portion 1500.

At this point, the various sensor values are obtained in real time.

Next, the estimation portion 2020 estimates a brake hydraulic pressure on the basis of the various sensor values obtained in the input portion 2010.

First, the estimation portion 2020 estimates the brake hydraulic pressure on the basis of the pedal position obtained through the pedal position sensor portion 1400 or the motor position obtained through the motor position sensor portion 1200, and the estimating of the brake hydraulic pressure on the basis of the pedal position or the motor position is valid only when all the wheels FR, FL, RR, and RL are in a braking state.

Accordingly, the estimation portion 2020 in the electronic control unit 2000 estimates a movement amount of the hydraulic piston 114 on the basis of the motor position measured by the motor position sensor MPS installed at the motor 120, which is included in the electric brake system 1 according to the present disclosure, and calculates a volume of brake fluid on the basis of the estimated movement amount of the hydraulic piston 114.

Figure 5:
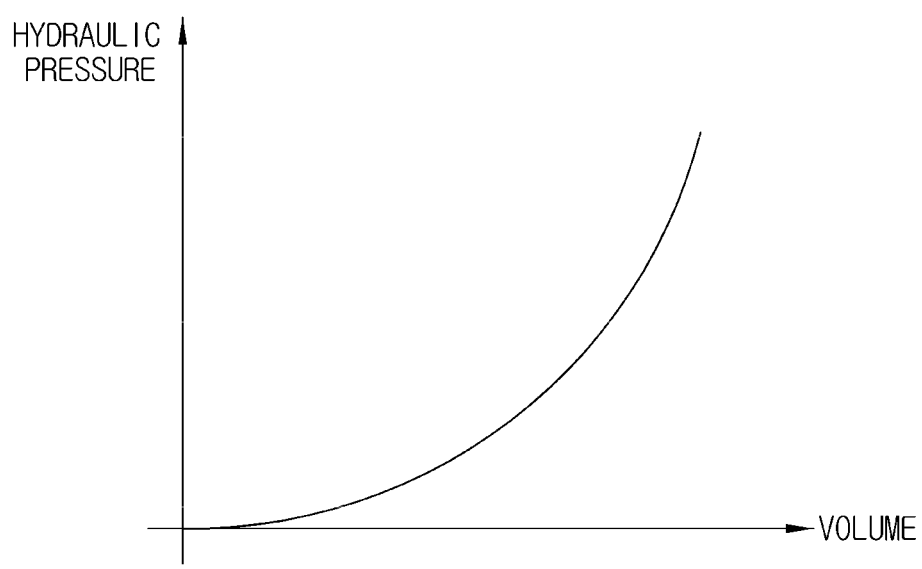
FIG. 5 is a graph schematically illustrating a hydraulic pressure according to a volume in the electronic brake system according to one embodiment of the present disclosure.

At this point, the brake hydraulic pressure may be estimated on the basis of the calculated volume of brake fluid according to a characteristic curve of required fluid amount shown in FIG. 5.

Specifically, FIG. 5 is a graph illustrating a characteristic curve of required liquid amount in the electric brake system 1 according to the present disclosure.

That is, the characteristic curve of required fluid amount may be used to calculate a variation $\Delta P$ of a hydraulic pressure generated according to a volume variation $\Delta V$ of a fluid amount flowing into a caliper (not shown) of each wheel, thereby calculating a braking pressure generated at the caliper, and specifically, a predetermined function may be used in the characteristic curve of required fluid amount to calculate the variation $\Delta P$ of the hydraulic pressure generated according to the volume variation $\Delta V$ of the fluid amount flowing into the caliper.

Consequently, a first brake hydraulic pressure may be calculated according to the characteristic curve of required fluid amount on the basis of a motor position sensor value obtained by the motor position sensor MPS of the electric brake system 1 according to the present disclosure.

Also, in the case of the booster type hydraulic brake system shown in FIG. 2, the brake hydraulic pressure may also be estimated on the basis of a value measured by the pedal position sensor 11. That is, the estimation portion 2020 obtains a movement amount of the brake pedal 10 from the pedal position sensor 11 included in the booster type hydraulic brake system, and calculates the volume of brake fluid on the basis of the movement amount of the brake pedal 10. Next, the estimation portion 2020 may calculate the first brake hydraulic pressure according to the characteristic curve of required fluid amount on the basis of the calculated volume of brake fluid.

Next, a method for calculating a second brake hydraulic pressure on the basis of the acceleration information on the vehicle, which is obtained in the input portion 2010, will be described.

Specifically, the electronic control unit 2000 according to the present disclosure uses a longitudinal acceleration value obtained from the longitudinal acceleration sensor to estimate a brake hydraulic pressure on the basis of the acceleration information. In addition, the electronic control unit 2000 estimates the brake hydraulic pressure on the basis of the longitudinal acceleration value only when the vehicle is in straight deceleration.

Also, the electronic control unit 2000 assumes that a brake hydraulic pressure and a wheel pressure are the same as each other in a state in which opening and closing operations of each wheel's the valves are absent.

At this point, the second brake hydraulic pressure may be calculated according to Equation 1 and Equation 2 on the basis of the longitudinal acceleration value as follows.

$$Ma_x = -F_{brk} - F_{roll} - F_{drag} - Mg\sin\theta \qquad \text{[Equation 1]}$$

$$F_{brk} = \mu P_{brk} A_{cyl} \frac{r_{eff}}{r_w} \qquad \text{[Equation 2]}$$

Here, M refers to a vehicle weight, $a_x$ refers to the longitudinal acceleration, $F_{brk}$ refers to a tire braking force, that is, a braking force of the vehicle, $F_{roll}$ is vehicle rolling resistance and refers to rolling resistance, $F_{drag}$ is a vehicle drag force and refers to air resistance g refers to an acceleration of gravity, $\theta$ refers to a road gradient, $\mu$ refers to a friction coefficient of a disc pad, $P_{brk}$ refers to a brake cylinder pressure, $A_{cyl}$ refers to a brake cylinder area, $r_{eff}$ refers to an effective wheel radius, and $r_w$ refers to a dynamic wheel radius.

Figure 6:
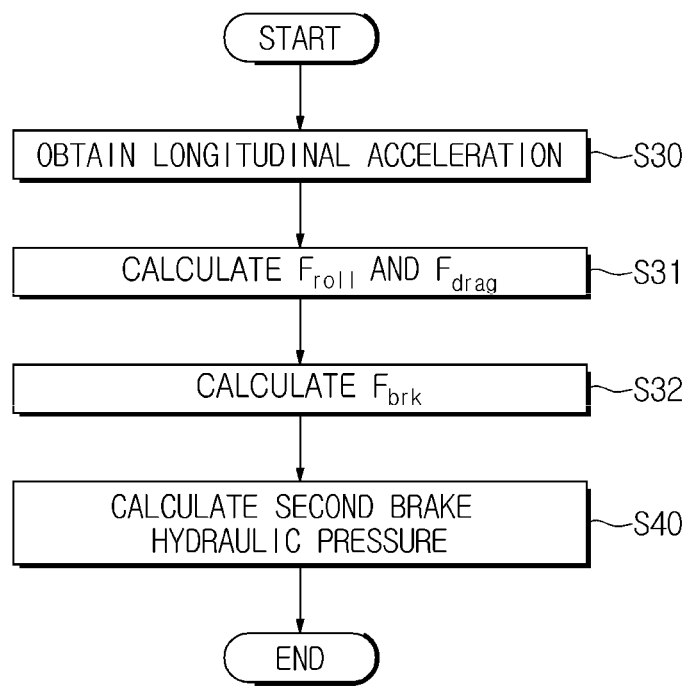
FIGS. 6 and 7 are flowcharts each illustrating a hydraulic pressure calculation method according to one embodiment of the present disclosure.
Figure 7:
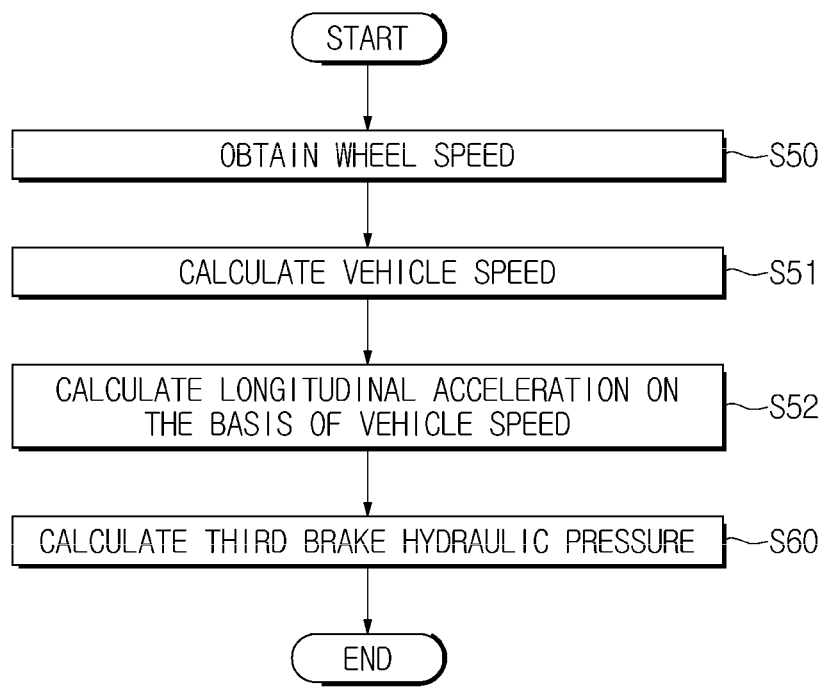

Specifically, FIGS. 6 and 7 are flowcharts each illustrating a method for calculating a hydraulic pressure according to one embodiment, and FIG. 6 is a flowchart illustrating a method for calculating a second brake hydraulic pressure on the basis of a longitudinal acceleration value.

First, as shown in FIG. 6, after a longitudinal acceleration is obtained (S30), the estimation portion 2020 may calculate a vehicle force in a longitudinal direction on the basis of the longitudinal acceleration $a_x$ and a vehicle weight M. Here, the vehicle force in the longitudinal direction is calculated by Equation 1 only in a state in which a road gradient is absent, and thus the estimation portion 2020 obtains $F_{roll}$ and $F_{drag}$ (S31).

Next, the estimation portion 2020 calculates the braking force $F_{brk}$ of the vehicle according to Equation 2 (S32).

Thereafter, the estimation portion 2020 may calculate the second brake hydraulic pressure through a relationship between the braking force $F_{brk}$ of the vehicle and the brake cylinder pressure $P_{brk}$ (S40).

Next, a method for calculating a third brake hydraulic pressure on the basis of the wheel speed information on the vehicle, which is obtained in the input portion 2010, will be described.

FIG. 7 is a flowchart illustrating a method for calculating a third brake hydraulic pressure on the basis of the wheel speed information.

Specifically, the electronic control unit 2000 according to the present disclosure uses a wheel speed value obtained from the wheel speed sensor to estimate a brake hydraulic pressure on the basis of the wheel speed value measured by the wheel speed sensor (S50). In addition, the electronic control unit 2000 estimates the brake hydraulic pressure on the basis of the wheel speed value measured by the wheel speed sensor only when the vehicle is in straight deceleration.

That is, the estimation portion 2020 estimates a vehicle speed on the basis of the wheel speed value measured by the wheel speed sensor according to Equation 3 and Equation 4 (S51), and calculate a longitudinal acceleration of the vehicle on the basis of the estimated vehicle speed (S52).

$$V = r_w w_w \quad \text{[Equation 3]}$$

$$a_{x\_byV} = \frac{dV}{dt} \quad \text{[Equation 4]}$$

Here, V refers to the vehicle speed, $w_w$ refers to a wheel rotation speed, $r_w$ refers to a dynamic wheel radius, and $a_{x\_byV}$ refers to the longitudinal acceleration.

Consequently, the estimating portion 2020 may estimate the brake hydraulic pressure according to Equation 1 and Equation 2 on the basis of the longitudinal acceleration of the vehicle, which is calculated according to Equation 3 and Equation 4 (S60).

At this point, the brake hydraulic pressure estimated on the basis of the wheel speed of the vehicle, which is obtained from the wheel speed sensor, is referred to as the third brake hydraulic pressure.

However, the electronic control unit 2000 in the electric brake system 1 according to the present disclosure directly obtains a brake hydraulic pressure from the pressure sensor portion 1500 of the sensor part 1000. Hereinafter, the brake hydraulic pressure, which is directly obtained as described above, is referred to as a fourth brake hydraulic pressure so as to distinguish the brake hydraulic pressure from the first to third brake hydraulic pressures.

Next, the determination portion 2030 in the electronic control unit 2000 compares the brake hydraulic pressure estimated in the estimation portion 2020 with the fourth brake hydraulic pressure obtained from the pressure sensor portion 1500 to determine whether the plurality of sensors in the sensor part 1000 operate normally.

Hereinafter, a method for determining reliability of a sensor signal by the determination portion 2030 will be described in detail.

The reliability of the sensor signal is determined only when the first to third brake hydraulic pressures estimated by the estimation portion 2020 are valid.

First, the determination portion 2030 selects a reference pressure among the first to fourth brake hydraulic pressures to determine reliability of each sensor signal. At this point, the determination portion 2030 compares an error between the selected reference pressure and the remaining brake hydraulic pressures with an error between a slope of the selected reference pressure and slopes of the remaining brake hydraulic pressures.

For example, a case in which the determination portion 2030 selects the first brake hydraulic pressure as the reference pressure will be described.

First, when an error between the first brake hydraulic pressure and the second brake hydraulic pressure is maintained for a longer period of time over a predetermined period of time than a first set error, the determination portion 2030 reduces first-second reliability. In addition, when an error between a variation of the first brake hydraulic pressure and a variation of the second brake hydraulic pressure is maintained for a longer period of time over a predetermined period of time than a second set error, the determination portion 2030 reduces the first-second reliability The reliability represents how stably and consistently a brake hydraulic pressure is measured, and refers to a degree of an accurate measurement without errors with respect to each of the first to fourth brake hydraulic pressures obtained from the wheel speed sensor, the motor position sensor, the acceleration sensor, the pedal position sensor, and the pressure sensor which are included in the sensor part 1000 of the present disclosure.

As one example, in the case of a hydraulic pressure circuit including a motor position sensor (for example, the hydraulic pressure circuit shown in FIG. 1), the sensor part 1000 may compare first to fourth brake hydraulic pressures which are obtained from the wheel speed sensor, the motor position sensor, the acceleration sensor, and the pressure sensor.

As one example, in the case of a hydraulic pressure circuit (for example, the hydraulic pressure circuit according to FIG. 2) in which the motor position sensor is omitted, the sensor part 1000 may compare first to fourth brake hydraulic pressures which are obtained from the wheel speed sensor, the acceleration sensor, the pedal position sensor, and the pressure sensor.

When the error between the first brake hydraulic pressure and the second brake hydraulic pressure, or the error between the variance of the first brake hydraulic pressure and the variance of the second brake hydraulic pressure is less than the first set error or the second set error, the determination portion 2030 determines that both the first brake hydraulic pressure and the second brake hydraulic pressure, which are estimated in the estimation portion 2020, fall within a reliability range.

Thereafter, the determination portion 2030 compares the first brake hydraulic pressure as a reference pressure with the third brake hydraulic pressure to obtain first-third reliability, and compares the first brake hydraulic pressure as the reference pressure with the fourth brake hydraulic pressure to obtain first-fourth reliability.

When an abnormality occurs in a sensor estimating the first brake hydraulic pressure, the first-second reliability, the first-third reliability, and the first-fourth reliability may be less than the reference reliability.

Next, the determination portion 2030 repeatedly evaluates reliabilities by setting the second brake hydraulic pressure to the fourth brake hydraulic pressure as the reference pressures.

In the case that third-first reliability obtained when the third brake hydraulic pressure is set as the reference pressure has a value that is less than preset reliability (that is, the third-first reliability is low), fourth-first reliability obtained when the fourth brake hydraulic pressure is set as the reference pressure has a value that is less than the preset reliability (that is, the fourth-first reliability is low), and the remaining reliabilities (that is, second-third reliability, second-fourth reliability, and third-fourth reliability) are within the reliability range, the determination portion 2030 determines that a sensor signal of the first brake hydraulic pressure is unreliable.

Accordingly, the determination portion 2030 estimates the brake hydraulic pressure using the sensor signal of the first brake hydraulic pressure on the basis of the motor position obtained through the motor position sensor portion 1200 or the pedal position obtained through the pedal position sensor portion 1400, and since reliability of such an estimation method or the sensor is low, the determination portion 2030 determines a failure.

Hereinbefore, a case in which the reliability of the sensor signal of the first brake hydraulic pressure is low has been described.

However, when the determination portion 2030 repeatedly calculates reliabilities by setting the first to fourth brake hydraulic pressures as the reference pressure, the determination portion 2030 may detect an abnormality of the sensor signal of the first brake hydraulic pressure as well as detect a specific sensor having reliability that is less than the reference reliability on the basis of the second brake hydraulic pressure obtained by the acceleration sensor, the third brake hydraulic pressure obtained by the wheel speed sensor, or the fourth brake hydraulic pressure obtained by the pressure sensor.

Hereinbefore, a configuration of the electric brake system 1 according to the present disclosure has been described.

FIGS. 8 to 11 are each flowcharts of a control method of the electric brake system 1 according to the present disclosure.

The electric brake system 1 according to the present disclosure receives sensor signals from a plurality of sensors included in the vehicle.

Specifically, in the electric brake system 1, the input portion 2010 obtains a wheel speed sensor signal from the wheel speed sensor portion 1100, motor position information from the motor position sensor portion 1200, an acceleration value of the vehicle from the acceleration sensor portion 1300, a pedal position sensor value from the pedal position sensor portion 1400, and a pressure value from the pressure sensor portion 1500 (S10, S30, S50, and S70), wherein the wheel speed sensor portion 1100, the motor position sensor portion 1200, the acceleration sensor portion 1300, the pedal position sensor portion 1400, and the pressure sensor portion 1500 are included in the sensor part 1000.

Here, in the case of the electric brake system 1 shown in FIG. 1, the input portion 2010 obtains a motor position sensor value acquired by the motor position sensor MPS, and, in the case of the booster type hydraulic brake system shown in FIG. 2, the input portion 2010 obtains a pedal position sensor value from the pedal position sensor 11 (S10).

Thereafter, the estimation portion 2020 calculates a first brake hydraulic pressure according to the characteristic curve of required fluid amount (S20). For example, the estimation portion 2020 obtains a pedal movement amount from the pedal position sensor 11 included in the booster type hydraulic brake system, and calculates a volume of brake fluid on the basis of the pedal movement amount.

Next, the estimation portion 2020 may calculate the first brake hydraulic pressure according to the characteristic curve of required fluid amount on the basis of the calculated volume of brake fluid.

Also, the input portion 2010 obtains a longitudinal acceleration value from the acceleration sensor portion 1300 (S30), and the estimation portion 2020 calculates a second brake hydraulic pressure using Equation 1 and Equation 2 on the basis of the longitudinal acceleration value (S40).

Next, the estimation portion 2020 calculates a third brake hydraulic pressure on the basis of the wheel speed obtained through the input portion 2010 (S60). Specifically, the estimation portion 2020 may calculate the third brake hydraulic pressure using Equation 1 to Equation 4 on the basis of the wheel speed.

Also, the electronic control unit 2000 in the electric brake system 1 according to the present disclosure directly obtains a brake hydraulic pressure from the pressure sensor portion 1500 of the sensor part 1000. In order to distinguish the brake hydraulic pressure, which is directly obtained, from the first to third brake hydraulic pressures, the brake hydraulic pressure is referred to as a fourth brake fluid pressure (S80).

Thereafter, the electronic control unit 2000 in the electric brake system 1 according to the present disclosure compares with the first to fourth brake hydraulic pressures (S100) and checks validity of each of the sensor signals.

A method for checking validity of each of sensor signals is described with reference to FIG. 9.

Figure 8:
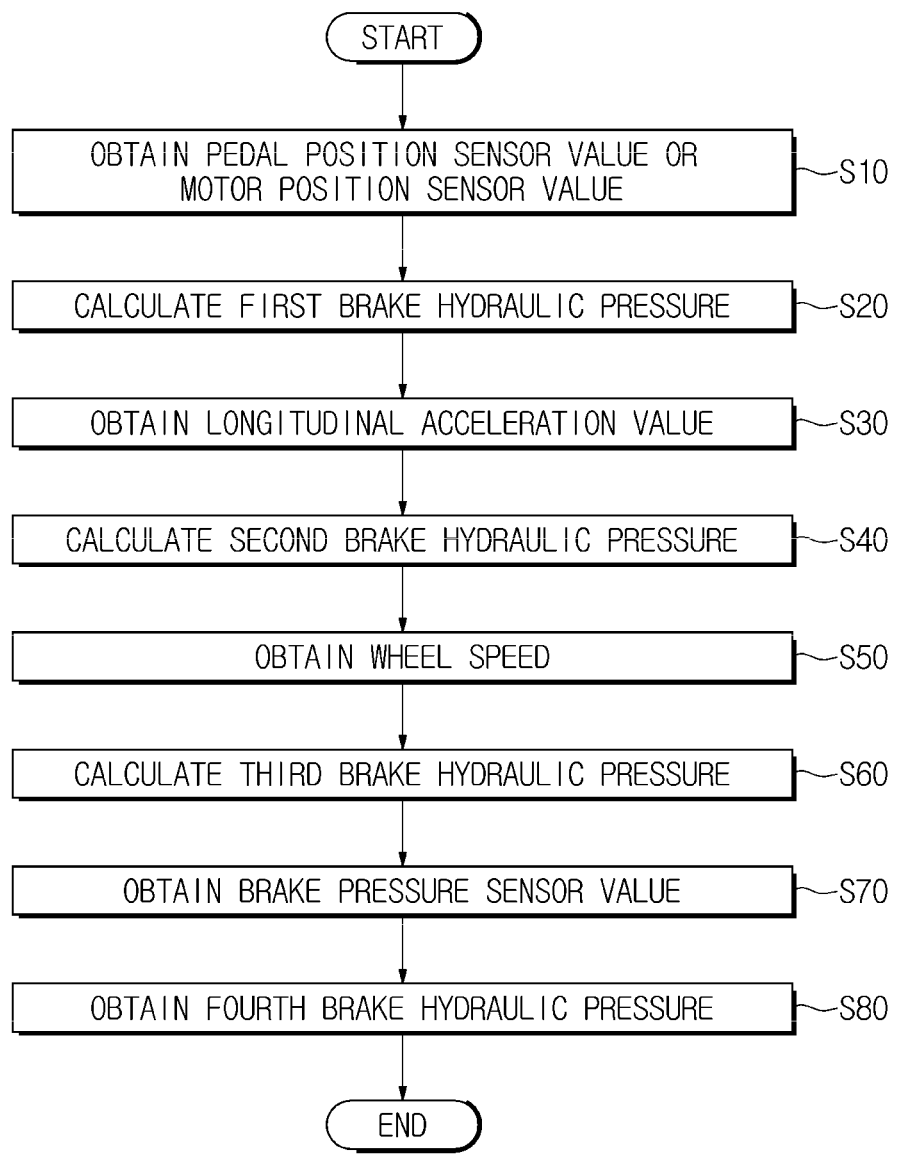
FIG. 8 is a partial flowchart of the electronic braking system according to one embodiment of the present disclosure.
Figure 9:
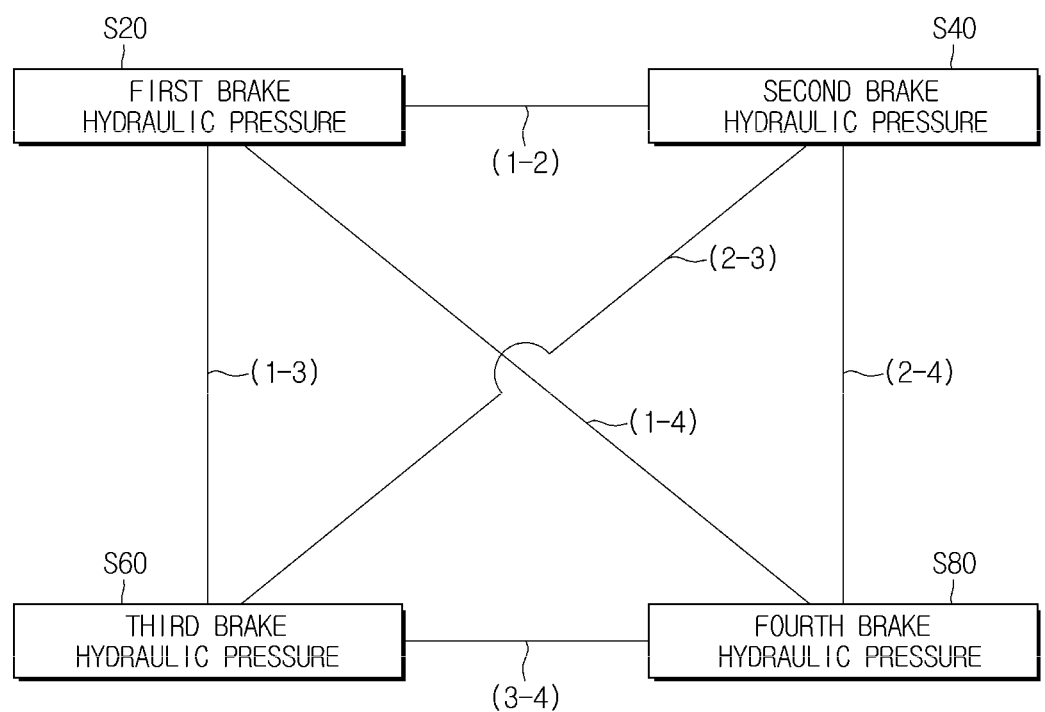
FIG. 9 is a schematic diagram illustrating a method for determining unreliability of a sensor according to one embodiment of the present disclosure.

Specifically, as shown in FIG. 9, the electronic control unit 2000 calculates the first to fourth brake hydraulic pressures through S20 to S80 of FIG. 8, and compares the first to fourth brake hydraulic pressures to obtain reliabilities.

First, (1-2) shown in FIG. 9 refers to first-second reliability that is calculated by comparing the first brake hydraulic pressure with the second brake hydraulic pressure on the basis of the first brake hydraulic pressure, (1-3) refers to first-third reliability that is calculated by comparing the first brake hydraulic pressure with the third brake hydraulic pressure on the basis of the first brake hydraulic pressure, and (1-4) refers to first-fourth reliability that is calculated by comparing the first brake hydraulic pressure with the fourth brake hydraulic pressure on the basis of the first brake hydraulic pressure. Also, (2-3) refers to second-third reliability that is calculated by comparing the second brake hydraulic pressure with the third brake hydraulic pressure on the basis of the second brake hydraulic pressure, (2-4) refers to second-fourth reliability that is calculated by comparing the second brake hydraulic pressure with the fourth brake hydraulic pressure on the basis of the second brake hydraulic pressure, and (3-4) refers to third-fourth reliability that is calculated by comparing the third brake hydraulic pressure with the fourth brake hydraulic pressure on the basis of the third brake hydraulic pressure.

Figure 10:
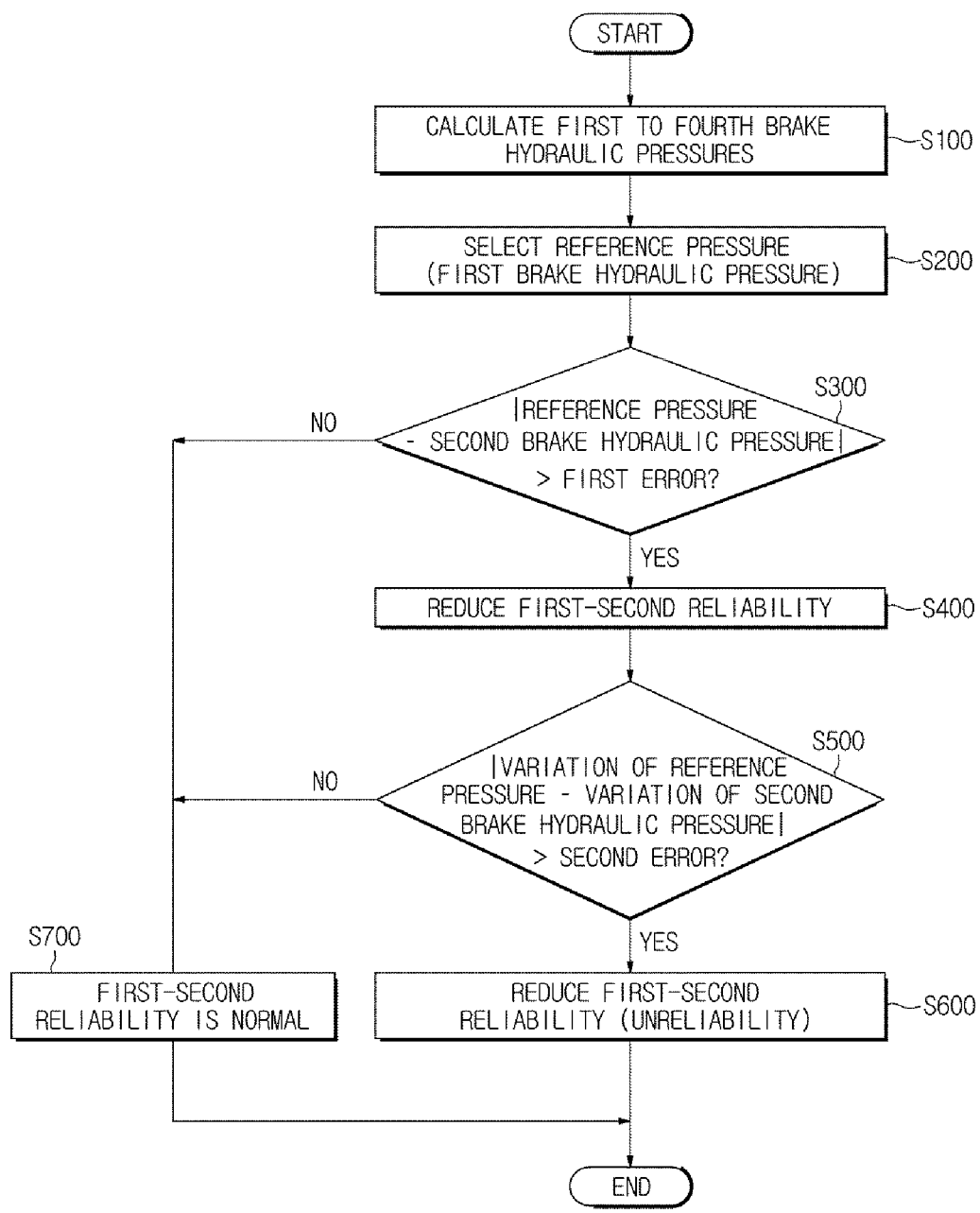
FIGS. 10 and 11 are each flowcharts of an electronic brake control method for determining unreliability of a sensor according to one embodiment of the present disclosure.
Figure 11:
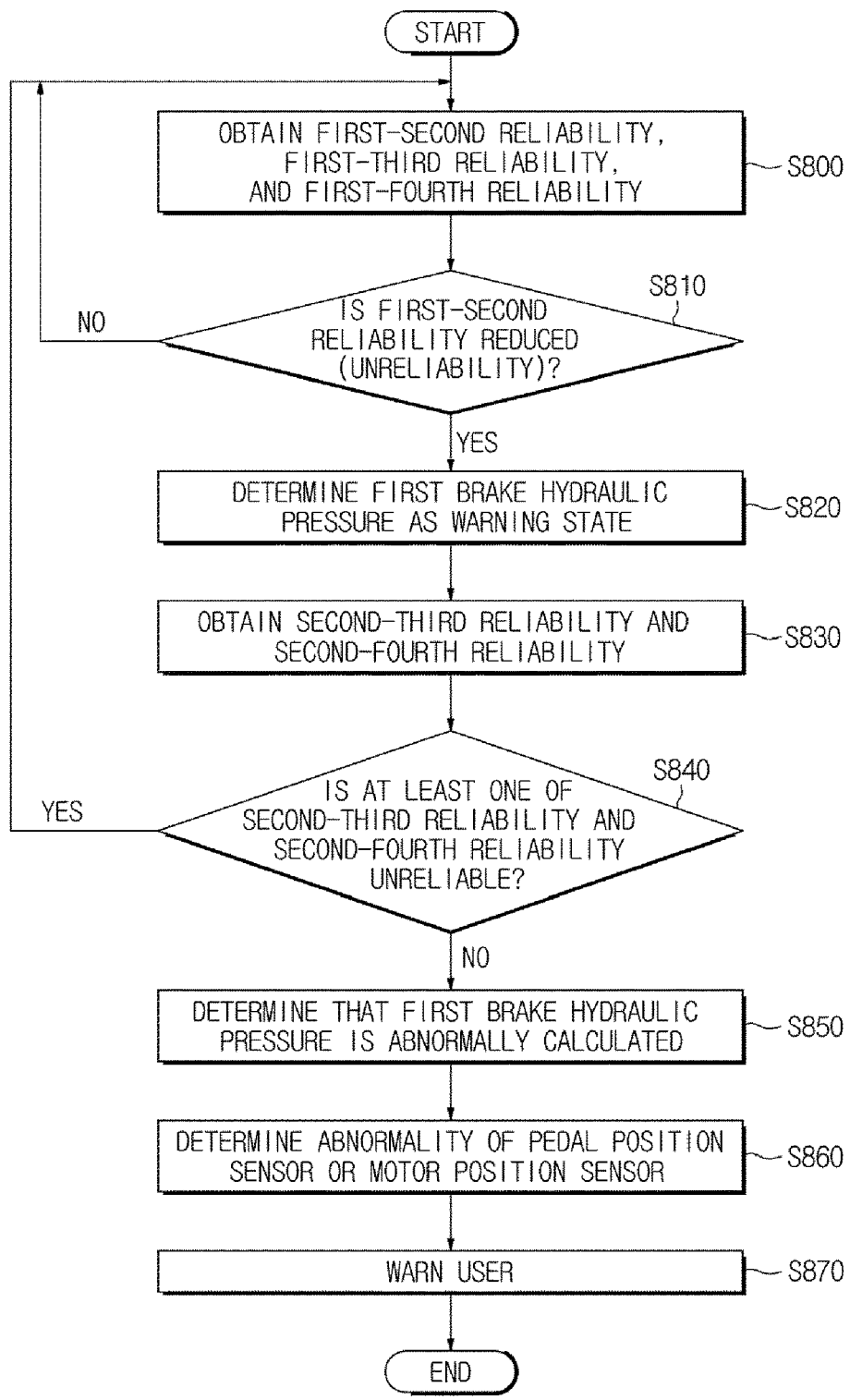

Specifically, FIGS. 10 and 11 are each flowcharts for a case in which the first brake hydraulic pressure is set as a reference pressure. Specifically, operations for obtaining the reliability of each of the first brake hydraulic pressure and the second brake hydraulic pressure have been described, and FIG. 10 is a flowchart for a case in which an abnormality occurs in the sensor signal that is used to calculate the first brake hydraulic pressure.

First, the determination portion 2030 selects a reference pressure (S200). In FIG. 10, the first brake hydraulic pressure is selected as the reference pressure.

Thereafter, an error between the reference pressure and the second brake hydraulic pressure is calculated (S300). When an error between the first brake hydraulic pressure and the second brake hydraulic pressure is maintained for a longer period of time over a predetermined period of time than a first set error (YES in S300), the determination portion 2030 first reduces the first-second reliability (S400).

In addition, when an error between a variation of the first brake hydraulic pressure and a variation of the second brake hydraulic pressure is maintained for a longer period of time over a predetermined period of time than a second set error (YES in S500), the determination portion 2030 reduces the first-second reliability (S600).

Here, when the error between the reference pressure and the second brake hydraulic pressure and the error between the variation of the first brake hydraulic pressure and the variation of the second brake hydraulic pressure, which are calculated in the determination portion 2030, are less than the first set error or the second set error, respectively, reliability is secured such that the determination portion 2030 determines the first-second reliability as a normal (S700).

Also, although not shown in the drawing, like the method for calculating the first-second reliability, the determination portion 2030 may calculate the first-third reliability, the first-fourth reliability, the second-third reliability, the second-fourth reliability, and the third-fourth reliability.

With reference to FIG. 11, a method for evaluating reliability of a sensor by comparing with the plurality of calculated reliabilities will be described below. Specifically, FIG. 11 is a flowchart of a method for determining an abnormal signal when the determination portion 2030 calculates the first brake hydraulic pressure.

First, as shown in FIG. 11, the determination portion 2030 obtains the first-second reliability, the first-third reliability, and the first-fourth reliability (S800).

Thereafter, when only the first-second reliability among the plurality of obtained reliabilities is reduced (that is, unreliability) and the remaining obtained reliabilities fall within a normal range (YES in S810), the determination portion 2030 determines the first brake hydraulic pressure to be in a warning state in which the first brake hydraulic pressure may be in an abnormality determination situation (S820).

Accordingly, to further determine whether the first brake hydraulic pressure may be confirmed to be abnormal, the determination portion 2030 additionally obtains the second-third reliability and the second-fourth reliability (S830).

At this point, when at least one of the second-third reliability and the second-fourth reliability is in an unreliable state (YES in S840), the determination portion 2030 returns to (S800).

When both the second-third reliability and the second-fourth reliability are in a reliable state (NO in S840), the determination portion 2030 may determine that the first brake hydraulic pressure is abnormally calculated (S850). Consequently, the electronic control unit 2000 warns the user that an abnormality occurs in a corresponding sensor on the basis of the determination result (S870).

As should apparent from the above description, the electronic parking brake according to one embodiment of the present disclosure is capable of improving reliability of a validity determination for a brake hydraulic pressure sensor.

Also, the electronic parking brake according to one embodiment of the present disclosure is capable of providing a validity determination method for a brake hydraulic pressure sensor, which is able to reduce driver's anxiety about a sensor failure by continuously sensing failures and current states of the brake hydraulic pressure sensor, a longitudinal acceleration sensor, and a motor position sensor.

Although the present disclosure has been described above by way of specific embodiments and the accompanying drawings, the present disclosure is not limited thereto, it should be understood that numerous modified embodiments can be devised by those skilled in the art without departing from the gist defined by the appended claims, and such modified embodiments should not be individually understood from the present disclosure.

What is claimed is:

1. An electric brake system of a vehicle, comprising:
   a sensor part configured to acquire sensor values respectively measured by three or more sensors, wherein the sensor part includes the three or more sensors which are selected from the group consisting of (i) a motor position sensor MPS configured to measure a position of a motor, (ii) an acceleration sensor configured to measure a longitudinal acceleration of a vehicle, (iii) a wheel speed sensor configured to measure a wheel speed of the vehicle, and (iv) a pressure sensor configured to measure a brake hydraulic pressure of a wheel; and
   a controller configured to
      receive signals of the sensor values transmitted from the sensor part including the three or more sensors,
      estimate three or more brake hydraulic pressures based on the received signals of the sensor values,
      select a reference pressure from among the three or more brake hydraulic pressures,
      respectively calculate reliability for each of the three or more sensors by comparing the reference pressure with the three or more brake hydraulic pressures and setting a reference reliability, and
      determine that a sensor, among the three or more sensors, has a largest deviation from the reference reliability, and the determined sensor is determined to be a failure.

2. The electric brake system of claim 1, wherein the three or more brake hydraulic pressures are selected from the group consisting of
   (i) a first brake hydraulic pressure which is estimated based on the measured position of the motor,
   (ii) a second brake hydraulic pressure hick is estimated based on the measured longitudinal acceleration of the vehicle,
   (iii) a third brake hydraulic pressure which is estimated based on the measured wheel speed of the vehicle, and
   (iv) a fourth brake hydraulic pressure which is estimated based on the measured brake hydraulic pressure of a wheel.

3. The electric brake system of claim 1, wherein the controller is configured to warn a failure of the sensor when the sensor is determined to be a failure.

4. An electric brake system of a vehicle, comprising:
   a sensor part configured to acquire sensor values respectively measured by three or more sensors, wherein the sensor part includes the three or more sensors which are selected from the group consisting of (i) a pedal position sensor configured to measure a position of a pedal, (ii) an acceleration sensor configured to measure a longitudinal acceleration of a vehicle, (iii) a wheel speed sensor configured to measure a wheel speed of the vehicle, and (iv) a pressure sensor configured to measure a brake hydraulic pressure of a wheel; and
   a controller configured to
      receive signals of the sensor values transmitted from the sensor part including the three or more sensors,
      estimate the three or more brake hydraulic pressures based on the received signals of the sensor values,
      select a reference pressure from among the three or more brake hydraulic pressures,
      respectively calculate reliability for each of the three or more sensors by comparing the reference pressure with the three or more brake hydraulic pressures and setting a reference reliability, and determine that a sensor, among the three or more sensors, has a largest deviation from the reference reliability, and the determined sensor is determined to be a failure.

5. A control method of an electric brake system of a vehicle, comprising:
receiving three or more sensor information, wherein the three or more sensor information which are selected from the group consisting of (i) position information of a motor measured by a motor position sensor MPS, (ii) longitudinal acceleration information of a vehicle measured by an acceleration sensor, (iii) wheel speed information measured by a wheel speed sensor, and (iv) brake hydraulic pressure information measured by a pressure sensor;
estimating three or more brake hydraulic pressures based on the received three or more sensor information;
selecting a reference pressure from among the three or more brake hydraulic pressures;
respectively calculating reliability for each of the three or more sensors by comparing the reference pressure with the three or more brake hydraulic pressures and setting a reference reliability; and
determining that a sensor, among the three or more sensors, has a largest deviation from the reference reliability, and the determined sensor is determined to be a failure.

6. The method of claim 5, wherein the three or more brake hydraulic pressures are selected from the group consisting of
(i) a first brake hydraulic pressure which is estimated based on the measured position of the motor,
(ii) a second brake hydraulic pressure which is estimated based on the measured longitudinal acceleration of the vehicle,
(iii) a third brake hydraulic pressure which is estimated based on the measured wheel speed of the vehicle, and
(iv) a fourth brake hydraulic pressure which is estimated based on the measured brake hydraulic pressure of a wheel.

7. The method of claim 5, further comprising
warning a failure of the sensor when the sensor is determined to be a failure.

8. A control method of an electric brake system of a vehicle, comprising:
receiving three or more sensor information, wherein the three or more sensor information which are selected from the group consisting of (i) pedal position information measured by a brake pedal position sensor, (ii) longitudinal acceleration information of a vehicle measured by an acceleration sensor, (iii) wheel speed information measured by a wheel speed sensor, and (iv) brake hydraulic pressure information measured by a pressure sensor;
estimating three or more brake hydraulic pressures based on the received three or more sensor information;
selecting a reference pressure from among the three or more brake hydraulic pressures;
respectively calculating reliability for each of the three or more sensors b comparing the reference pressure with the three or more brake hydraulic pressures and setting a reference reliability; and
determining that a sensor, among the three or more sensors, has a largest deviation from the reference reliability, and the determined sensor is determined to be a failure.

* * * * *